United States Patent Office.

JOHN COMMINS, OF CHARLESTON, SOUTH CAROLINA.

Letters Patent No. 78,061, dated May 19, 1868.

IMPROVED MODE OF TREATING MINERAL PHOSPHATES FOR THE MANUFACTURE OF FERTILIZERS.

*The Schedule referred to in these Letters Patent and making part of the same.*

TO ALL WHOM IT MAY CONCERN:

Be it known that I, JOHN COMMINS, of Charleston, in the district of Charleston, and State of South Carolina, have invented a new and improved Mode of Treating Mineral Phosphates in the Manufacture of Fertilizers; and I do hereby declare that the following is a full, clear, and exact description thereof, which will enable those skilled in the art to make and use the same.

This invention relates to a new and improved method of treating phosphatic minerals and earths after such minerals or earths have been treated with a solution of chloride of sodium, or with a solution containing chloride of sodium, or without such treatment.

And my invention consists in treating such minerals or earths in the manner hereinafter described.

That is to say, I heat the phosphate or phosphatic minerals or earths, and then plunge the same into gas-liquor from the gas-house, when such liquor has been combined with one part of sulphuric acid to two hundred parts of the gas-liquor, or when combined in other proportions, or when it has been combined with any other chemical substance equivalent thereto.

In certain cases I may find it necessary or expedient to omit to combine the gas-liquor with any other substance whatever, for treating the above-mentioned phosphatic minerals or earths.

In some cases I may desire to treat the mineral or earthy phosphates with gas-liquor, when such phosphates have not been previously subjected to the chloride of sodium solution treatment, as described in the Letters Patent granted me, February 25, 1868.

In such cases I would treat the phosphates in a heated state with the simple gas-liquor, or with the gas-liquor combined with sulphuric or other equivalent acid, or with chloride of sodium in any desired proportions.

My object is to render the mineral, earthy, or natural phosphates soluble, so that they may be used as fertilizers when applied to the soil.

In their natural state it is well known that they are not soluble in the soil, and do not serve as fertilizers. By my process of treating them with gas-liquor alone, or with gas-liquor combined with other substances, they are rendered valuable as fertilizers by a simple and cheap method.

Having thus described my invention, I claim as new, and desire to secure by Letters Patent—

1. Treating mineral or earthy or natural phosphates, while in a heated state, with gas-liquor and sulphuric acid, when such phosphates have previously been treated with a solution of chloride of sodium.

2. Treating such phosphates, when in a heated state, with gas-liquor, when such liquor is combined with sulphuric acid or any other acid or salt, whether such phosphates have been previously treated with a solution of chloride of sodium or not, substantially as and for the purposes described.

The above specification of my invention signed by me, this 21st day of March, 1868.

JOHN COMMINS.

Witnesses:
  JNO. E. RIVERS,
  JOHN T. HUMPHREYS.